United States Patent
Denike et al.

(10) Patent No.: US 7,325,569 B2
(45) Date of Patent: Feb. 5, 2008

(54) BUTTERFLY VALVE WITH INTEGRAL SPLIT FLAPPER RELIEF VALVE

(75) Inventors: Stuart K. Denike, Phoenix, AZ (US); Ronald J. Louis, Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 243 days.

(21) Appl. No.: 11/114,469

(22) Filed: Apr. 25, 2005

(65) Prior Publication Data

US 2006/0237680 A1 Oct. 26, 2006

(51) Int. Cl.
*F16K 15/18* (2006.01)

(52) U.S. Cl. .............. 137/899.2; 137/614.17; 137/512.1; 137/523; 137/599.18; 244/118.5

(58) Field of Classification Search ........ 251/305–308, 251/83, 212; 137/523, 522, 512.1, 899.2, 137/599.18, 614.17; 244/118.5
See application file for complete search history.

(56) References Cited

U.S. PATENT DOCUMENTS

| | | | | |
|---|---|---|---|---|
| 1,872,412 A | * | 8/1932 | Cole | 137/599.18 |
| 2,140,734 A | * | 12/1938 | Chandler | 137/601.17 |
| 3,070,345 A | | 12/1962 | Knecht | |
| 3,208,472 A | | 9/1965 | Scaramucci | |
| 3,463,189 A | * | 8/1969 | Fitzpatrick | 251/306 |
| 3,640,306 A | * | 2/1972 | Vogt | 137/512.1 |
| 3,678,958 A | | 7/1972 | Satterwhite et al. | |
| 3,993,096 A | * | 11/1976 | Wilson | 137/512.1 |
| 4,694,853 A | | 9/1987 | Goodwin | |
| 4,770,392 A | * | 9/1988 | Schmidt | 251/227 |
| 4,964,422 A | * | 10/1990 | Ball et al. | 137/512.1 |
| 5,056,557 A | * | 10/1991 | Tervo | 251/308 |
| 5,105,729 A | | 4/1992 | Signoret et al. | |
| 5,301,709 A | | 4/1994 | Gasaway | |
| 5,372,109 A | | 12/1994 | Thompson et al. | |
| 5,819,791 A | | 10/1998 | Chronister et al. | |
| 5,984,269 A | | 11/1999 | Short, III et al. | |
| 6,003,554 A | * | 12/1999 | Magdelyns et al. | 137/630.14 |
| 6,012,483 A | | 1/2000 | Beddies | |
| 6,343,615 B1 | | 2/2002 | Miller et al. | |
| 6,537,258 B1 | * | 3/2003 | Guala | 137/522 |
| 6,543,474 B2 | * | 4/2003 | Fetterman, Jr. | 137/519.5 |
| 6,945,278 B2 | * | 9/2005 | Bunn et al. | 137/899.2 |
| 2003/0131894 A1 | | 7/2003 | Heckt et al. | |

FOREIGN PATENT DOCUMENTS

| | | |
|---|---|---|
| DE | 198 03 364 C1 | 7/1999 |
| EP | 06112982.1 | 8/2006 |
| FR | 1 454 795 A | 12/1966 |
| WO | WO91/00463 | 1/1991 |

* cited by examiner

*Primary Examiner*—John Bastianelli
(74) *Attorney, Agent, or Firm*—Ingrassia Fisher & Lorenz

(57) ABSTRACT

A valve is provided that includes a valve housing, a valve element, and a flapper. The valve housing has a passage. The valve element is rotationally mounted in the passage and moveable between an open position and a closed position. Additionally, the valve element has a flow channel extending therethrough. The flapper is coupled to the valve element and moveable between a closed position, to thereby substantially seal the flow channel, and an open position, to thereby unseal the flow channel, the flapper configured to move to the open position when a differential pressure across the flapper reaches a predetermined value.

16 Claims, 5 Drawing Sheets

BUTTERFLY VALVE WITH INTEGRAL SPLIT FLAPPER RELIEF VALVE

TECHNICAL FIELD

The present invention relates generally to an aircraft environmental control system, and more particularly to a butterfly valve that allows air to flow through an air duct in the system in the event an unexpected pressure differential is detected across the valve.

BACKGROUND

An air distribution system may be used to direct air from one portion of an aircraft to another. In some aircraft configurations, the air distribution system includes an inlet duct that receives air from an air source and two or more outlet ducts that exhaust the received air to a desired area within the aircraft, such as, for example, to an aircraft cabin or an underfloor section of the aircraft. To maintain aircraft weight at certain requirements, the ducts typically have thin walls that are made from lightweight materials, such as wrapped composite. Conventionally, a flow splitter is positioned between the inlet and outlet ducts to distribute the air between the two or more outlet ducts. The flow splitter includes a butterfly valve that is coupled to an actuator that opens and closes the valve upon command from the aircraft control system. When the valve is closed, the air circulates through a first system that includes the inlet duct and one of the outlet ducts. Similarly, when the valve is open, the air circulates through a second system that includes the inlet duct and another one of the outlet ducts.

In rare instances in which the air flow experiences a sudden increase in flow rate, pressure on one side of the valve may exceed an acceptable level. Specifically, if the valve is closed, the ducts of the first system may experience an unwanted buildup of pressure. As a result, the pressure may need to be relieved. Typically, the butterfly valve is opened to allow air to flow through the second system; however, if the control system fails to command the butterfly valve to open, the pressure in the first system may increase to an unacceptable level. Consequently, the structural integrity of the thin-walled ducts may be compromised.

To overcome some of the above-mentioned drawbacks, a parallel duct system has been implemented into some aircraft. The parallel duct system is coupled to the air distribution system and directs air either overboard or to other sections of the aircraft when the pressure across the valve exceeds acceptable levels. However, this system, too, may have disadvantages. Specifically, the parallel duct system includes additional components which may increase the weight and/or manufacturing cost of the aircraft.

Accordingly, there is a need for an air distribution system that maintains structural integrity in the event of an unexpected airflow rate increase. In addition, there is a need for an air distribution system that is lightweight and relatively inexpensive to implement. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides a valve for use in an aircraft environmental control system. In one embodiment, and by way of example only, the valve includes a valve housing, a valve element, and a flapper. The valve housing has a passage. The valve element is rotationally mounted in the passage and moveable between an open position and a closed position. Additionally, the valve element has a flow channel extending therethrough. The flapper is coupled to the valve element and moveable between a closed position, to thereby substantially seal the flow channel, and an open position, to thereby unseal the flow channel, the flapper configured to move to the open position when a differential pressure across the flapper reaches a predetermined value.

In another embodiment, and by way of example only, an aircraft environmental control system is provided. The system includes an inlet duct, an outlet duct, and a valve. The inlet duct is configured to receive a flow of air from an airflow source. The outlet duct is coupled to the inlet duct and configured to exhaust the flow of air to the aircraft cabin. The valve includes a valve housing, a shaft, a valve element, and a flapper. The valve housing has a passage. The shaft extends at least partially across the valve housing passage. The valve element is rotationally mounted in the passage and moveable between an open position and a closed position. Additionally, the valve element has a flow channel extending therethrough. The flapper is coupled to the valve element and moveable between a closed position, to thereby substantially seal the flow channel, and an open position, to thereby unseal the flow channel, the flapper configured to move to the open position when a differential pressure across the flapper reaches a predetermined value.

Other independent features and advantages of the preferred valve will become apparent from the following detailed description, taken in conjunction with the accompanying drawings which illustrate, by way of example, the principles of the invention.

BRIEF DESCRIPTION OF THE DRAWINGS

The following drawings are illustrative of the particular embodiments of the invention and therefore do not limit its scope. They are presented to assist in providing a proper understanding of the invention. The drawings are not to scale and are intended for use in conjunction with the explanations in the following detailed descriptions. The present invention will hereinafter be described in conjunction with the appended drawings, wherein like reference numerals denote like elements, and.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
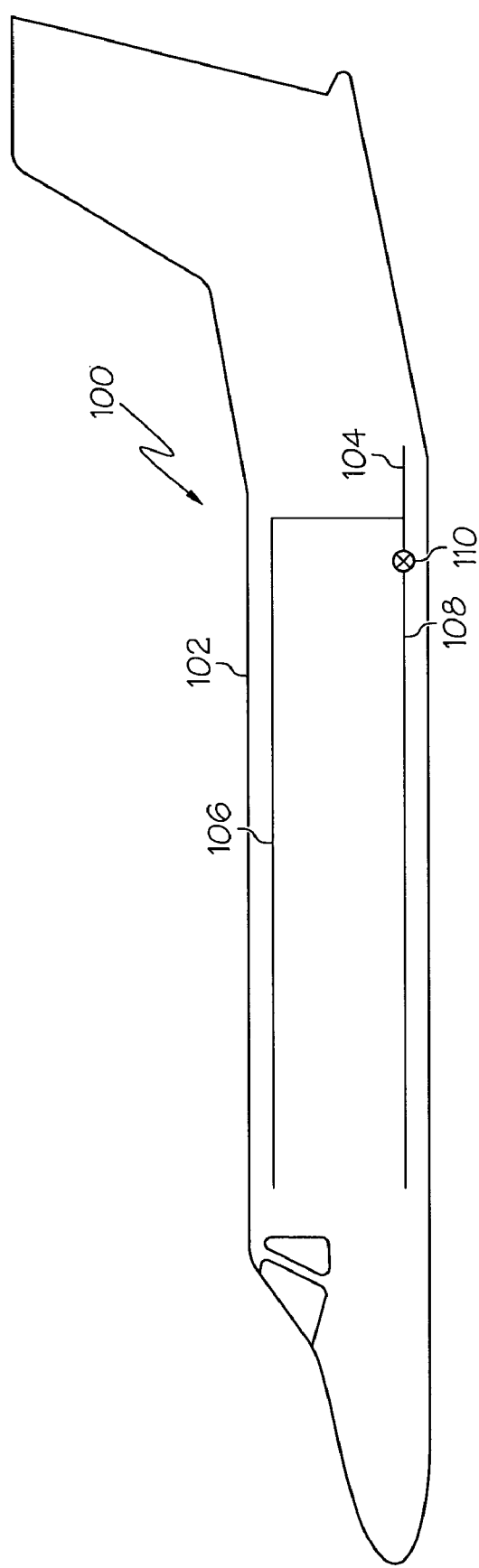
FIG. 1 is a simplified schematic illustrating a portion of an aircraft air distribution system.

FIG. 1 is a simplified schematic diagram illustrating an air distribution system 100 disposed within an aircraft 102. The air distribution system 100 includes an inlet duct 104, two outlet ducts 106 and 108, and a valve 110 positioned in duct 108. The inlet duct 102 receives air from an air source, such as, for example, engine bleed air, and the outlet ducts 106 and 108 exhaust air into desired sections of the aircraft 102. In one exemplary embodiment, one outlet duct 106 exhausts air into an aircraft cabin (not shown) and the other outlet duct 108 exhaust airs into an aircraft underfloor. It will be appreciated that although two outlet ducts 106 and 108 are depicted herein, fewer or more outlet ducts may be incorporated into the system 100. The valve 110 is configured to open and close to direct the air to either outlet duct 106 or outlet duct 108 and to seal and unseal when a pressure differential across the valve 110 exceeds a predetermined value.

Figure 2:
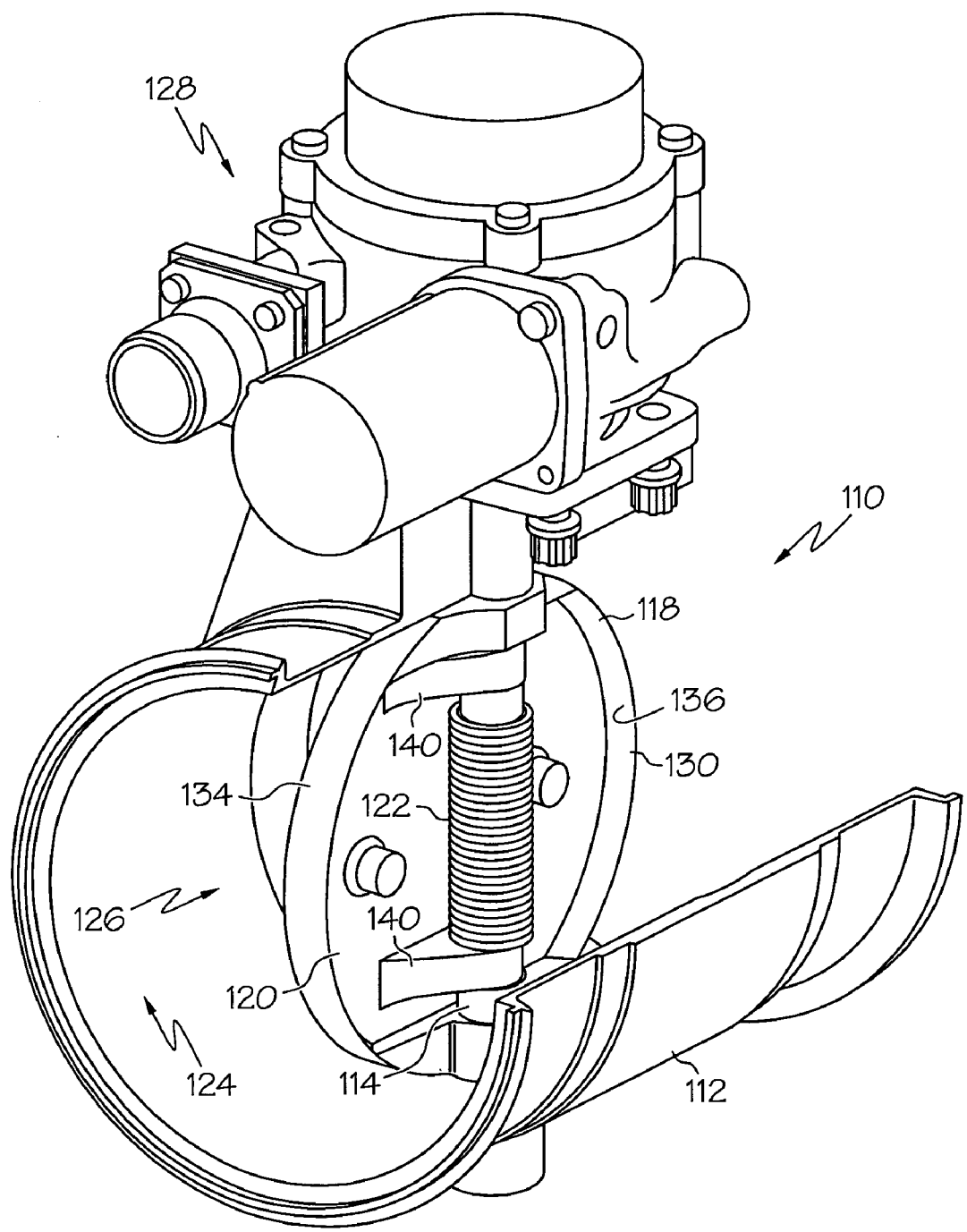
FIG. 2 is an isometric view of an exemplary valve in an open position that may be implemented into the system depicted in FIG. 1.
Figure 3:
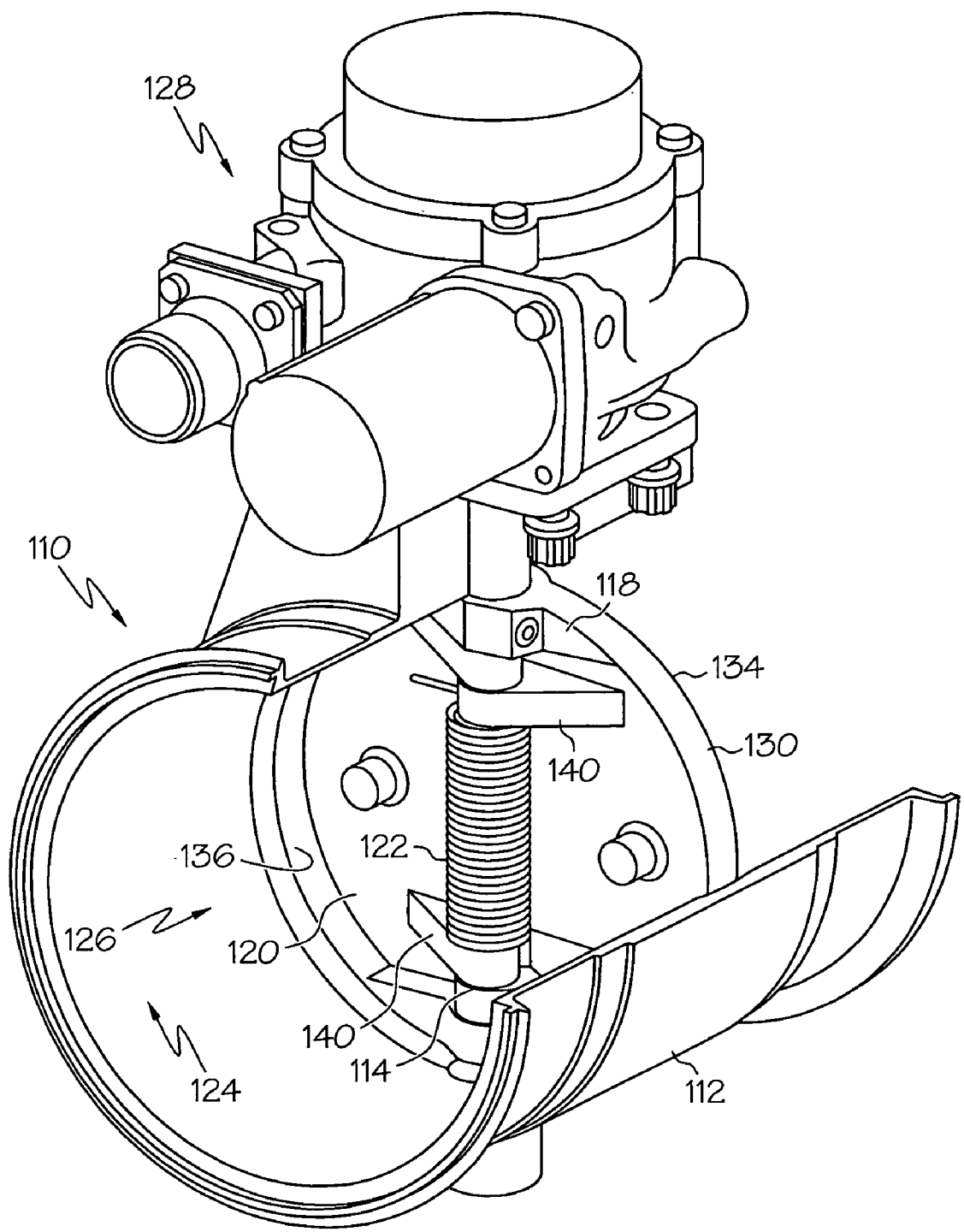
FIG. 3 is an isometric view of the exemplary valve of FIG. 2 in a closed position.

Turning now to FIGS. 2 and 3, an embodiment of particular physical implementation of the valve 110 is shown, and includes a valve housing 112, a shaft 114, a valve element 118, one or more flappers 120, and one or more torsion springs 122. The valve housing 112 is configured to be coupled between two duct segments, such as ducts 104, 106, and 108, and has an inner surface 124 that defines a passage 126. In another exemplary embodiment, the valve housing 112 include one or more holes formed therethrough for receiving the shaft 114.

The shaft 114 is disposed within and extends across the valve housing passage 126 and is rotationally mounted on the valve housing 116. Although depicted in the figures as extending radially across the valve housing passage 126, it will be appreciated that the shaft 114 may be extended in any other appropriate configuration and may extend across only a portion of the valve housing passage 126. The shaft 114 includes an end that is coupled to an actuator 128 that moves the valve 110 between the open position, shown in FIG. 2, and the closed position, shown in FIG. 3. The actuator 128 is electrically coupled to, and receives valve position command signals from, an aircraft control system (not shown). Although depicted herein as an electro-mechancial actuator, it will be appreciated that the actuator 128 may be configured as any one of numerous other conventional manners, such as, for example, electrical, mechanical, pneumatic, hydraulic, or combinations thereof.

The valve element 118 is coupled to the shaft 114 and is configured to rotate therewith. Additionally, the valve element 118 and flappers 120 are configured to relieve pressure that may buildup within the system 100 when a pressure differential across the valve 110 is greater than a predetermined value. In these regards, the valve element 118 is mounted to the shaft 114 and includes an annular shroud 130 and at least one flow channel 132 (shown in FIG. 4). The annular shroud 130 extends axially from the valve element 118 and has an outer peripheral surface 134 and an inner peripheral surface 136. The outer peripheral surface 134 is configured to seat against the valve housing inner surface 124, while the inner peripheral surface 136 is configured to surround the flappers 120.

Figure 4:
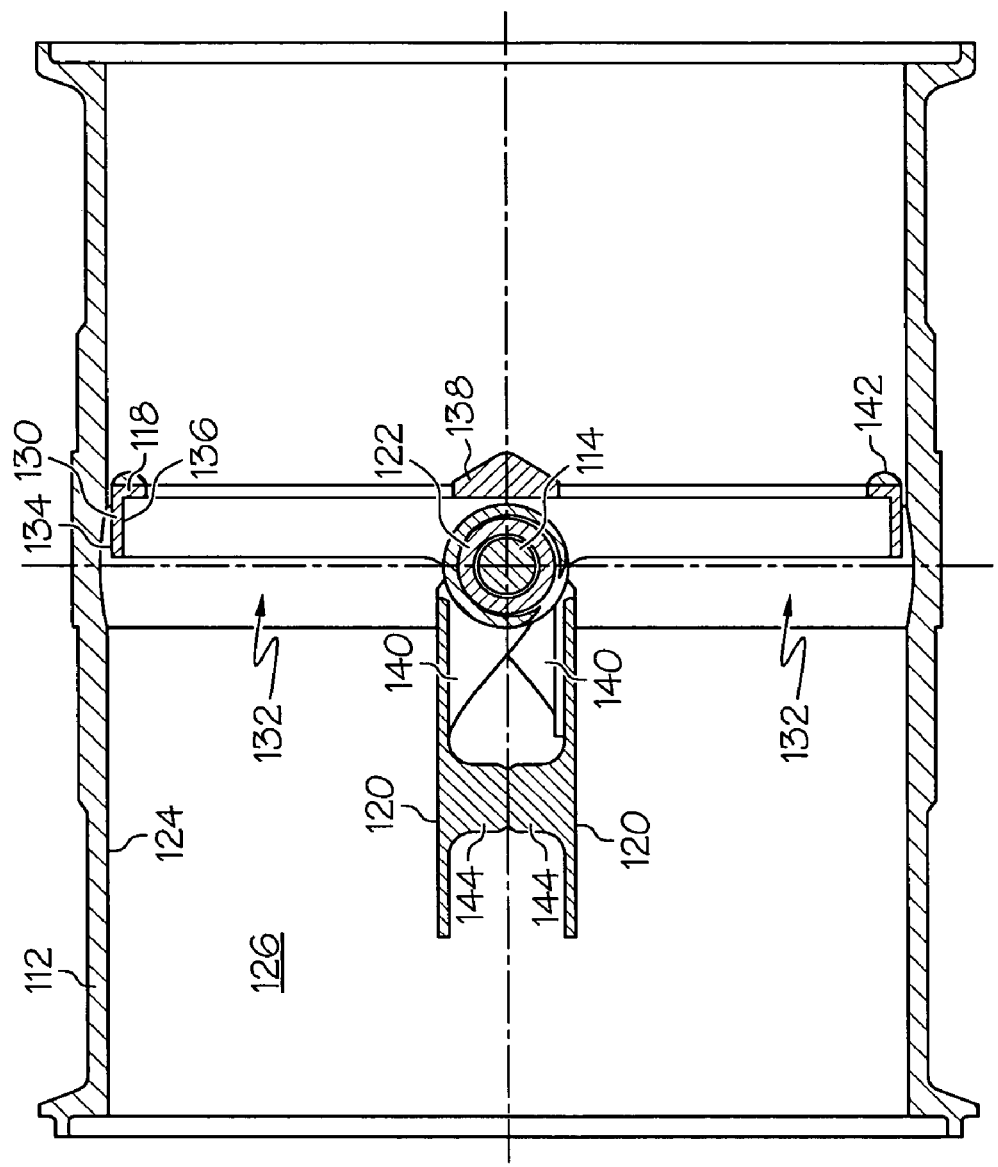
FIG. 4 is a cross section view of the exemplary valve of FIG. 2 in an unsealed position.

The flow channels 132 are formed through valve element 118, as shown more clearly in FIG. 4, and preferably have a total cross-sectional area that allows a maximum amount of air through the valve housing passage 126 without compromising the structural integrity of the valve 110 and ducts in the system 100. Thus, the flow channels 132 have a total cross-sectional area that is at least about 75% of the cross-sectional area of the valve housing passage 126, more preferably at least about 80%, and most preferably at least about 90%. As illustrated in the figures, a separator 138 extends across and divides the valve element 118 into two flow channels 132. The separator 138 may be integrally formed as part of the valve element 118 or may be a separate piece. Although the separator 138 is depicted in the figures as dividing the valve element 118 into two flow channels 132, it will be appreciated that fewer or more flow channels 132 may be formed in the valve element 118. In another exemplary embodiment, the valve 110 does not include a separator 138 and, instead, the shaft 114 is employed to divide the valve element 118 into a desired number of channels.

Figure 5:
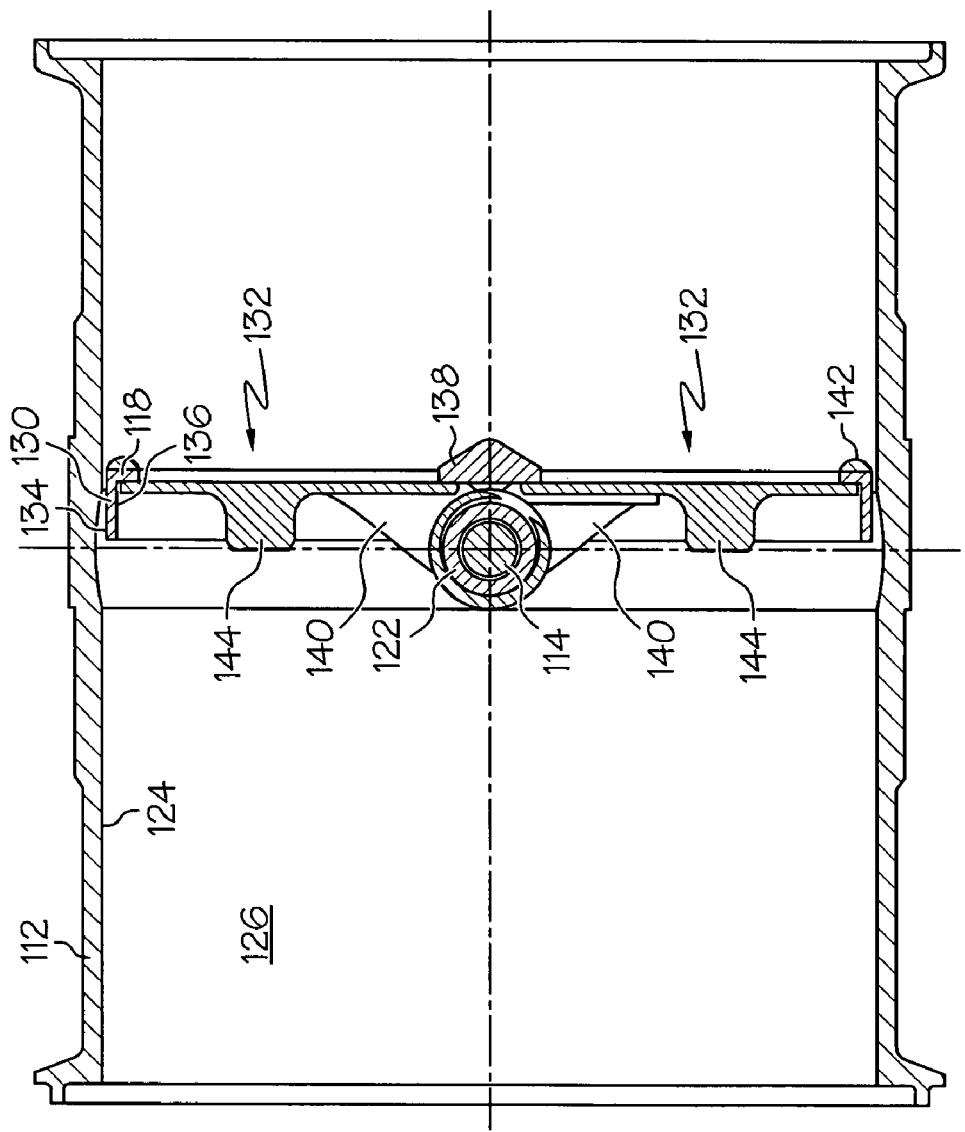
FIG. 5 is a cross section view of the exemplary valve of FIG. 2 in a sealed position.

The flappers 120 are configured to move between an open position to unseal the flow channels 132, as shown in FIG. 4, and a closed position to substantially close the flow channels 132, as shown in FIG. 5. Each flapper 120 has an outer periphery 140 that is configured to contact the valve element 118 and is rotationally mounted to the shaft 114. Any conventional manner by which the flapper 120 may be coupled to the shaft 114 may be employed. For example, each flapper 120 may include a flange 140 that is configured to receive the shaft 114. Although two flappers 120 are depicted, it will be appreciated that more or fewer flappers for sealing and unsealing the one or more flow channels 132 may be employed as well.

During operation, the flappers 120 are preferably biased toward the seal position. In this regard, the flappers 120 are each coupled to one or more torsion springs 122 that are coupled to the shaft 114 and supply a torsional force that urges the flappers 120 toward the closed position. More specifically, the springs 122 are preferably configured to urge the flappers 120 to seal the flow channels 132 and to unseal the flow channels 132 when the differential pressure magnitude exceeds a predetermined value. Preferably, the predetermined value is a maximum pressure that can be withstood by the inlet duct 104 and the outlet ducts 106, 108 without comprising their structural integrity.

In some instances, the springs 122 may be preloaded to allow the flappers 120 to open at a relatively low pressure differential, such as at a pressure of about 1 psi. In such case, an air dam 142 is used to maintain the flappers 120 in the sealed position. The air dam 142 is a raised section of an outer periphery of the valve element 118 that is configured to block air from contacting the flappers 120 when the valve 110 is in an open position.

To limit the rotational movement of the flappers 120, rotational stops 144 are preferably included. The rotational stops 144 may have any configuration suitable for limiting rotational movement of the flappers 120. For example, the stops 144 may be protrusions that are formed on the flappers 120, as depicted in FIGS. 3 and 4. Alternatively, the stops 144 may be formed on a separate shaft that extends through the valve housing 114. The height and configuration of the stops 144 may vary depending on the desired amount of flapper 120 rotational movement. Preferably, the stops 144 are configured to allow the flappers 120 to each rotate approximately 90 degrees.

A valve has been provided that is capable of moving between an open and closed position and relieving pressure in an air distribution system in the event of an unexpected increase in air flow through the system. Additionally, the valve maintains the structural integrity of ducts that may be used in the system. The valve is lightweight, inexpensive to manufacture, and easily implemented into existing systems.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A valve comprising:
   a valve housing having a passage;
   a shaft coupled to the valve housing and extending at least partially across the passage;
   a valve element rotationally mounted in the passage and coupled to the shaft and moveable between an open position and a closed position, the valve element having a flow channel extending therethrough and an outer periphery;
   a flapper rotationally mounted to the shaft, the flapper moveable between a closed position, to thereby substantially seal the flow channel, and an open position, to thereby unseal the flow channel, the flapper configured to move to the open position when a differential pressure across the flapper reaches a predetermined value; and
   an air dam formed on the outer periphery of the valve element, the air dam being a raised section configured to block air from contacting the flappers when the valve is in an open position.

2. The valve of claim 1, further comprising:
   a torsion spring coupled to the flapper, the torsion spring configured to supply a torsional force to urge the flapper to the closed position.

3. The valve of claim 1, wherein the valve element includes an annular shroud, and the annular shroud is coupled to and extends axially from the valve element outer periphery and is configured to surround the flapper when the flow channel is sealed.

4. The valve of claim 1, further comprising:
   a rotational stop coupled to the flapper and configured to limit rotation of the flapper when the flow channel is unsealed.

5. The valve of claim 4, wherein the rotational stop is configured to limit rotation of the flapper to a rotational angle of less than about 90-degrees.

6. The valve of claim 1, wherein the valve element flow channel has a total cross sectional flow area that is greater than 75% of a cross sectional area of the valve housing passage.

7. The valve of claim 1, wherein the predetermined value is about 1 psi.

8. A valve comprising:
   a valve housing having a passage;
   a shaft rotationally mounted to the valve housing and extending at least partially across the valve housing passage;
   a valve element coupled to the shaft and moveable with the shaft between an open position and a closed position, the valve element having a flow channel extending therethrough and an outer periphery;
   a flapper rotationally mounted to the shaft and moveable between a closed position, to thereby substantially seal the flow channel, and an open position, to thereby unseal the flow channel, the flapper configured to move to the open position when a differential pressure across the flapper reaches a predetermined value; and
   an air dam formed on the outer periphery of the valve element, the air dam being a raised section configured to block air from contacting the flappers when the valve is in an open position.

9. The valve of claim 8, further comprising:
   a torsion spring coupled to the flapper, the torsion spring configured to supply a torsional force to urge the flapper to the closed position.

10. The valve of claim 9, wherein the valve element includes an annular shroud, and the annular shroud is coupled to and extends axially from the valve element outer periphery and is configured to surround the flapper when the flow channel is unsealed.

11. The valve of claim 8, further comprising:
    a rotational stop coupled to the flapper and configured to limit rotation of each flapper when the flow channels are unsealed.

12. The valve of claim 11, wherein each rotational stop is configured to allow the flapper to rotate to a rotational angle of about 90-degrees.

13. The valve of claim 8, wherein the valve element flow channel has a total cross sectional flow area that is greater than 75% of a cross sectional area of the valve housing passage.

14. An aircraft environmental control system, comprising:
    an inlet duct configured to receive a flow of air from an airflow source;
    an outlet duct coupled to the inlet duct and configured to exhaust the flow of air to an aircraft cabin; and
    a valve positioned within the outlet duct, the valve comprising:
      a valve housing having a passage;
      a shaft extending at least partially across the valve housing passage;
      a valve element rotationally mounted in the passage, coupled to the shaft, and moveable between an open position and a closed position, the valve element having a flow channel extending therethrough and an outer periphery;
      a flapper rotationally mounted to the shaft and moveable between a closed position, to thereby substantially seal the flow channel, and an open position, to thereby unseal the flow channel, the flapper configured to move to the open position when a differential pressure across the flapper reaches a predetermined value; and
    an air dam formed on the outer periphery of the valve element, the air dam being a raised section configured to block air from contacting the flappers when the valve is in an open position.

15. The system of claim 14, wherein the valve further comprises:
    a torsion spring coupled to the flapper, the torsion spring configured to supply a torsional force to urge the flapper to a closed position.

16. The system of claim 14, further comprising:
    an actuator coupled to the valve, the actuator configured to drive the valve element between the open position and the closed position.

* * * * *